United States Patent
Torii et al.

[11] Patent Number: 5,115,690
[45] Date of Patent: May 26, 1992

[54] MULTI-ARTICULATED INDUSTRIAL ROBOT WITH AN OFFSET ROBOT ARM

[75] Inventors: Nobutoshi Torii, Tokyo; Hitoshi Mizuno; Masanao Miyawaki, both of Yamanashi, all of Japan

[73] Assignee: Fanuc Ltd., Minamitsuru, Japan

[21] Appl. No.: 582,214

[22] PCT Filed: Jan. 29, 1990

[86] PCT No.: PCT/JP90/00103
§ 371 Date: Sep. 28, 1990
§ 102(e) Date: Sep. 28, 1990

[87] PCT Pub. No.: WO90/08632
PCT Pub. Date: Aug. 9, 1990

[30] Foreign Application Priority Data
Jan. 30, 1989 [JP] Japan .................. 1-17432

[51] Int. Cl.$^5$ .................. G05G 11/00; B25J 9/00
[52] U.S. Cl. .................. 74/479; 901/27; 901/28
[58] Field of Search .................. 74/479; 901/15, 27, 901/28, 50

[56] References Cited

U.S. PATENT DOCUMENTS

| | | | |
|---|---|---|---|
| 4,138,876 | 2/1979 | Chisum | 901/15 X |
| 4,659,279 | 4/1987 | Akeel et al. | 901/28 X |
| 4,780,045 | 10/1988 | Akeel et al. | 901/28 X |
| 4,959,958 | 10/1990 | Nishikawa et al. | 901/28 X |
| 4,960,040 | 10/1990 | Kumagai et al. | 901/28 X |
| 4,972,731 | 11/1990 | Akutagawa et al. | 901/50 X |
| 5,006,035 | 4/1991 | Nakashima et al. | 901/15 X |

FOREIGN PATENT DOCUMENTS

| | | | |
|---|---|---|---|
| 108657 | 5/1984 | European Pat. Off. | 901/15 |
| 2510023 | 1/1983 | France | 901/15 |
| 2626515 | 8/1989 | France | 901/15 |
| 62-84990 | 4/1987 | Japan . | |
| 63-295189 | 12/1988 | Japan . | |
| 64-11781 | 1/1989 | Japan . | |
| 1-177985 | 7/1989 | Japan | 901/27 |
| 63-185596 | 8/1989 | Japan . | |

Primary Examiner—Allan D. Herrmann
Assistant Examiner—David W. Laub
Attorney, Agent, or Firm—Armstrong, Nikaido, Marmelstein, Kubovcik & Murray

[57] ABSTRACT

An articulated industrial robot comprises a robot body (10), a robot upper arm (20) pivotally supported in a joint provided on the upper end (16) of the robot body (10) for a swing motion about a horizontal W-axis, and a robot forearm (30) pivotally supported in a joint provided on the extremity (24) of the robot upper arm (20) for an up-down turning motion about a horizontal U-axis. The robot upper arm (20) has an offset arm structure extending between the horizontal W-axis of the joint on the upper end (16) of the robot body (10) and the horizontal U-axis of the joint on the extremity (24) of the robot upper arm (20) with its back side (26) extending along the straight line connecting the respective centers of the horizontal W-axis and U-axis. Electric cables (40) and the like are extended along the back side (26) of the robot upper arm (20).

8 Claims, 2 Drawing Sheets

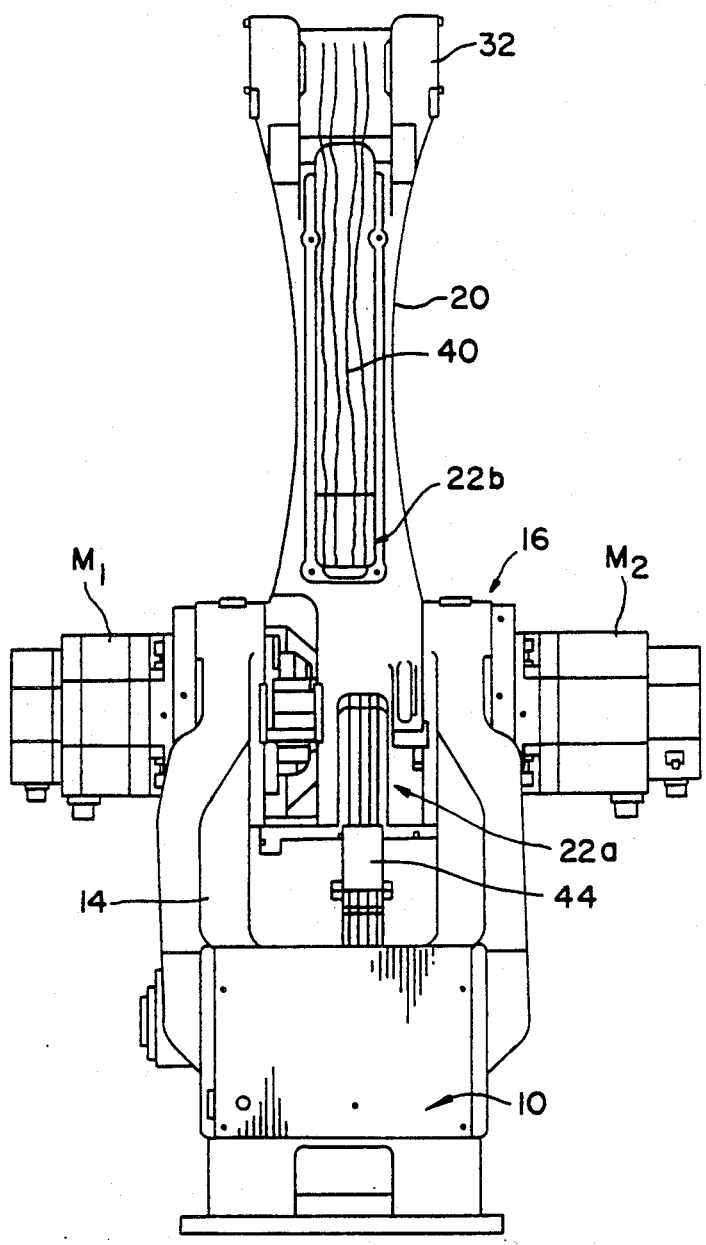
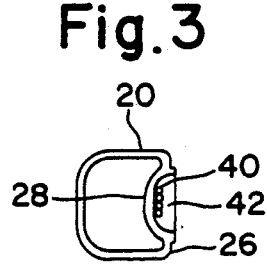

MULTI-ARTICULATED INDUSTRIAL ROBOT WITH AN OFFSET ROBOT ARM

TECHNICAL FIELD

The present invention relates to a multi-articulated industrial robot provided with a robot body, a robot upper arm pivotally supported about a joint formed at the upper end of the robot body for a swing motion about a first horizontal axis, and a robot forearm pivotally supported about a joint formed at the extremity of the robot upper arm for an up-down turning motion about a second horizontal axis and, more particularly, to a multi-articulated industrial robot provided with an offset robot upper arm having a back side thereof extended along a straight line connecting the horizontal axis of the joint formed at the upper end of the robot body and the horizontal axis of the joint formed at the extremity of the upper arm, and formed in a structure such that it allows electric cable and pipes to be extended along and laid against the back side.

PRIOR ART

It is known that an industrial robot generally called a multi-articulated robot is provided with a robot body having a fixing base at the bottom thereof, a robot upper arm pivotally supported about a joint formed at the upper end of the body for a swing motion about a horizontal axis (a first horizontal axis), and a robot forearm pivotally supported about a joint formed at the extremity of the robot upper arm for an up-down turning motion about a horizontal axis (a second horizontal axis). The robot assembly of such a multi-articulated robot is provided with electric motors for driving the robot upper arm and the robot forearm, and rotation detectors, such as generally known encoders, for detecting the quantities of motions, such as swing motions and up-down turning motions, of the robot arms through the detection of the quantities of motions of the electric motors, and accordingly, cables are essential for wiring the electrical equipment. Generally, the robot assembly is provided with cables and wiring accessories for the electrical equipment and, if necessary, pipes and piping accessories to supply an auxiliary gas or the like to the robot wrist and end effectors attached to the robot wrist. In the conventional multi-articulated robot, the robot upper arm is constructed so that portions thereof are arranged on one and the other sides of a straight line connecting the center of a swing motion of the joint articulating the robot body and the robot upper arm about an axis generally designated as "the W-axis" and the center of an up-down turning motion of the joint articulating the robot upper arm and forearm about an axis designated as "the U-axis". Namely, the straight line extends substantially through the central portion of the robot upper arm. When the robot upper arm is thus constructed and the cables and, when necessary pipes, are arranged on the robot assembly, particularly when the cables are extended along the outer surface of the robot, the cables are liable to be damaged. If the cables are extended through the interior of the robot assembly, the cables are bent rapidly or stretched by the actions of the robot arms, and thus the cables may be damaged or cut, causing problems in the operation of the robot assembly. Therefore, in general the cables are extended along the center axis of the robot upper arm between the robot body and the robot forearm.

Nevertheless, the extension of the cables along the center axis of the robot upper arm requires cumbersome work when removing the cables from the robot assembly for maintenance, or for repairing the electric motors, and when extending the cables again through the interior of the robot assembly after completing the maintenance work or repair.

DISCLOSURE OR THE INVENTION

Accordingly, an object of the present invention is to eliminate the disadvantages of the conventional multi-articulated industrial robot.

Another object of the present invention is to provide a multi-articulated industrial robot having an offset arm structure, namely, a robot arm structure which enables work for installing cables essential to the robot assembly or pipes and piping accessories, and maintenance work, to be performed easily on the outer surface of the robot assembly.

In view of the object of the invention, the present invention provides a multi-articulated industrial robot comprising:
 a robot body having a generally vertical body structure having a base at the bottom thereof, and a joint having a horizontal axis and provided in the uppermost portion of the body structure;
 a robot upper arm of a length pivotally supported at its lower end about the joint of the robot body for a swing motion about the horizontal axis of the joint, and provided with a joint at its upper end; and
 a robot forearm of a length pivotally supported at its rear end in the joint formed at the upper end of the robot upper arm for an up-down turning motion;
 characterized in that the robot upper arm is formed so as to extend substantially linearly between the respective horizontal axes of the joint on the upper end of the robot body and the joint on its upper end, the robot upper arm is provided with a back side thereof extending along a straight line connecting the respective centers of the horizontal axes of the joints, and the back side is formed to provide an area in which cables, such as electric cables, are permitted to lie and extend. Since the back side is readily accessible, the cables can be simply extended and removed from the robot assembly when assembling the robot assembly and carrying out maintenance service.

BRIEF DESCRIPTION OF THE DRAWINGS

The above and other objects, features and advantages of the present invention will be made apparent from the ensuring description of a preferred embodiment of the invention with reference to the accompanying drawings, wherein
FIG. 2 is a rear view taken in the direction of the arrows along the line II—II in FIG. 1; and,
 FIG. 3 is a sectional view taken along the line III—III in FIG. 1.

BEST MODE OF CARRYING OUT THE INVENTION

Figure 1:
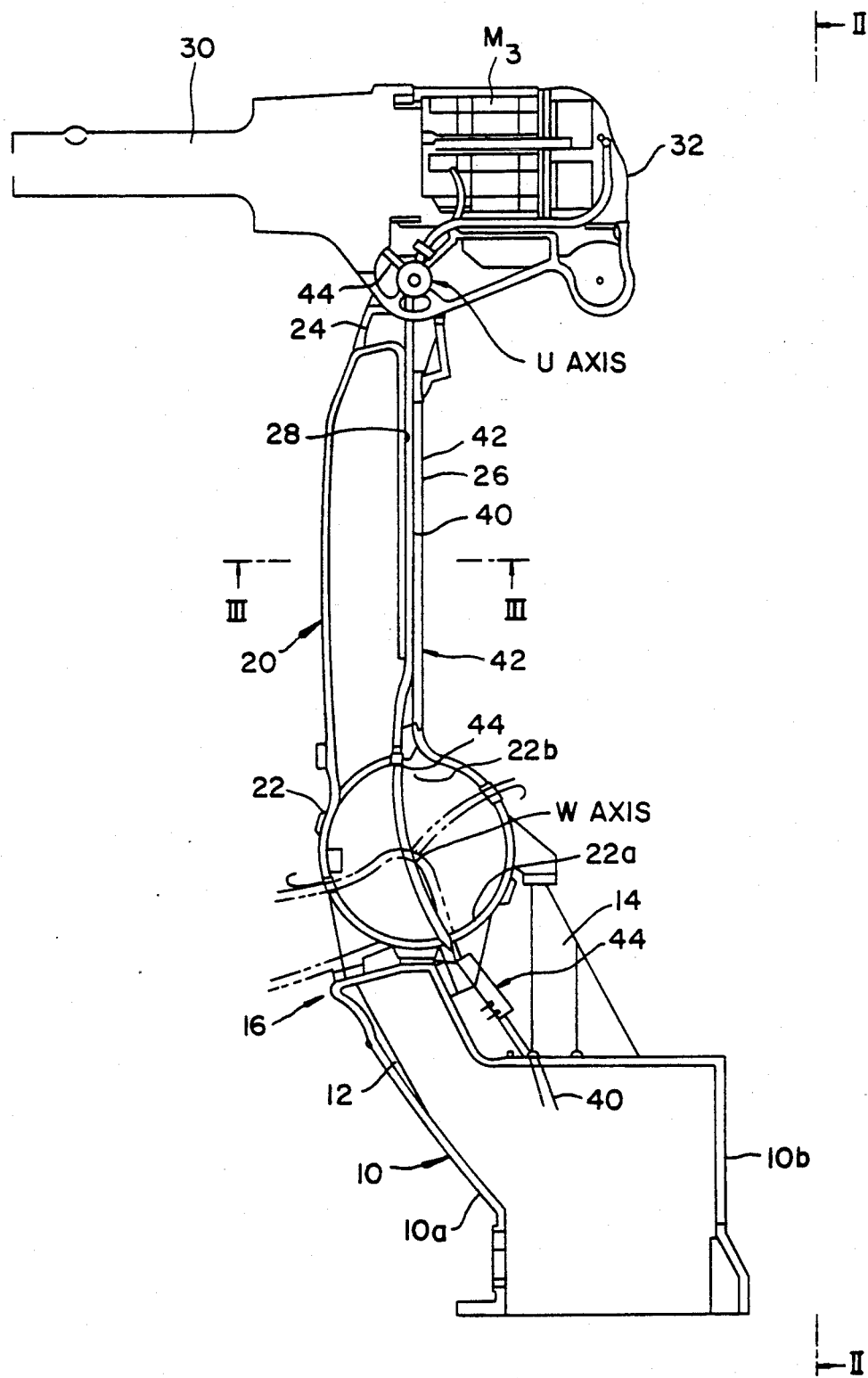
FIG. 1 is a sectional side elevation of a vertical articulated industrial robot having an offset arm structure in a preferred embodiment according to the present invention.

Referring to FIGS. 1 to 3, a multi-articulated industrial robot in a preferred embodiment according to the present invention has a robot body 10 having a base at its bottom, a front portion 10a and a rear portion 10b. The robot body 10 has a box-shaped structure. Cables and pipes can be passed into the box-shaped robot body 10 through an opening, not shown, formed in the wall of the same.

The box-shaped robot body 10 has an offsetting portion, i.e., a pedestal 12 extending obliquely upward to the front from its upper portion, and a pair of support members 14 provided respectively on rear side of the pedestal. A robot upper arm 20 is supported pivotally for swing motion about a horizontal axis, i.e., a W-axis, by the pedestal 12 and the support members 14 on the upper end 16 of the robot body 10. The robot upper arm 20 has a cylindrical lower end 22, which is joined to the robot body 10 and supported for turning in opposite directions on the upper end 16 of the robot body 10 between the support members 14 with its center axis in alignment with the W-axis as shown in FIG. 2. As best shown in FIG. 1, the robot upper arm 20 has an elongated tubular structure extending upward from the upper portion of the pedestal 12 of the robot body 10. Thus, the robot upper arm 20 having an offset structure offset toward the front of the robot assembly with respect to the center of the robot body 10. A robot forearm 30 is joined at its rear end 32 for an up-down turning motion about a horizontal axis, i.e., a U-axis, to the upper end 24 of the robot upper arm 20. The rear end 32 of the robot forearm 30 is provided internally with the electric motor $M_3$ and rotation detector of a robot wrist driving system, not shown. The electric motor $M_3$ and the rotation detector must be wired by electric cables to feed power to and to transfer electric signals between the electrical components including the motor $M_3$ and the rotation detector.

As best shown in FIG. 2, two electric motors $M_1$ and $M_2$ respectively for driving the robot upper arm 20 for a swing motion and driving the robot forearm 30 for an up-down turning motion are detachably attached to the side surfaces of the upper end 16 of the robot body 10 respectively on the opposite sides of the cylindrical lower end 22 of the robot upper arm 20 pivotally supported on the upper end 16 of the robot body 10.

It is noted that the robot upper arm 20 is offset to the front with respect to the geometrical center of the robot body 10 and is articulated to the robot body by a joint so that a straight line connecting the center of the cylindrical lower end 22, i.e., the W-axis, and the center of the rear end 32 of the robot forearm 30, i.e., the U-axis, coincide substantially with a vertical line when the robot upper arm 20 is in an upright position as shown in FIG. 1 and the back side 26 of the robot upper arm 20 extends in a plane including the straight line. Moreover, as best shown in FIG. 3 showing the cross section of the robot upper arm 20, a recess 28 is formed in the backside 26 of the robot upper arm 20 and the electric cables 40 are extended in the recess 28. Naturally, pipes may be extended in addition to the electric cables in the recess 28. The recess 28 is covered with a suitable cover 42 to protect and cover the electric cables 40. As stated above, the electric cables 40 are passed into the robot body 10, are fastened to the back side of the pedestal 12 with a suitable cable clamp 44, are passed into the cylindrical lower end 22 of the robot upper arm 20 through an opening 22a, are fastened again to the cylindrical lower end 22 at an upper opening 22b with a cable clamp 44, and are extended along the straight line connecting the W-axis and the U-axis to the upper end 24 of the robot upper arm 20. In the cylindrical lower end 22, the cables 40 pass across or near the W-axis. Accordingly, the electric cables 40 are not exposed to causes of damage and breakage, such as bending and stretching, when the robot upper arm 20 swings about the W-axis, because the electric cables 40 are extended along the straight line. Thus, the electric cables 40 are kept safe and protected. Furthermore, since the electric cables 40 are extended along and lie in the back side 26 of the robot upper arm 20, namely, since the electric cables 40 are extended externally of the robot assembly, the electric cables 40 are readily accessible when assembling the robot assembly or when carrying out maintenance service, simply by removing the cover 42, so that the electric cables 40 can very easily be extended on and removed from the robot assembly.

As apparent from the foregoing description, in a multi-articulated industrial robot according to the present invention, the electric cables can be extended along a straight line connecting the center of swing motion of the robot upper arm and the center of an up-down turning motion of the robot forearm on the back side of the robot upper arm of the robot assembly. Therefore, the electric cables are not subjected to causes of damage and breakage, such as bending and stretching, the electric cables are readily accessible when assembling the robot assembly and when carrying out maintenance service, and the electric cables are rarely damaged or broken.

We claim:

1. A multi-articulated industrial robot comprising:
   a robot body having a base at a bottom thereof and a generally upwardly extending body structure, said robot body provided at an upper end portion thereof with a first joint having a first horizontal axis;
   a robot upper arm of a length pivotally joined at a lower end thereof to said first joint of said robot body for swing motion about said first horizontal axis of said first joint, and provided at an extremity thereof with a second joint; and
   a robot forearm pivotally joined at a rear end to said second joint of said robot upper arm for up-down turning motion about a second horizontal axis;
   wherein said robot upper arm extends substantially linearly between the respective horizontal axes of said first joint provided on said upper end of said robot body and said second joint provided on said extremity of said robot upper arm, said robot upper arm is provided with a back side thereof extending along a straight line connecting the center of said horizontal axis of said first joint provided on said extremity of said robot upper arm, and said back side is formed to allow cables, such as electric cables, to be extended along and lie in said back side.

2. A multi-articulated industrial robot according to claim 1, wherein said robot body has a front portion, a rear portion, and an offset portion extending obliquely upward and frontward from the front portion, said robot upper arm is offset with respect to the straight line connecting said respective centers of said first and second horizontal axes, such that said offset places a centerline of said robot arm on a side of said straight line which is toward said front portion of said robot body.

3. A multi-articulated industrial robot according to claim 1, wherein said back side of said robot upper arm is provided with a recess providing a space available for extending said electric cables.

4. A multi-articulated industrial robot according to claim 3, wherein said robot upper arm includes a cylindrical lower end having said second horizontal axis located at a center thereof, and wherein said electric cables are passed through said robot body and are extended through said cylindrical lower end of said robot upper arm and within said recess of said back side of said robot upper arm.

5. A multi-articulated industrial robot according to claim 4, wherein said robot body further includes a pair of support members provided at a rear part of said offset portion, and wherein said cylindrical lower end of said robot upper arm is supported for swing motion between the pair of support members.

6. A multi-articulated industrial robot according to claim 3, wherein said recess of said robot upper arm is covered with a cover.

7. A multi-articulated industrial robot according to claim 1, wherein said rear end of said robot forearm pivotally supported about said second joint provided on said extremity of said robot upper arm is provided with an electric motor and an electrical rotation detector for driving and controlling a robot wrist.

8. A multi-articulated industrial robot according to claim 7, wherein said electrical cables are connected to the electric motor and the electrical rotation detector.

* * * * *